United States Patent
Pan et al.

(10) Patent No.: US 10,700,523 B2
(45) Date of Patent: Jun. 30, 2020

(54) SYSTEM AND METHOD FOR DISTRIBUTION LOAD FORECASTING IN A POWER GRID

(71) Applicant: General Electric Company, Schenectady, NY (US)

(72) Inventors: Yan Pan, Niskayuna, NY (US); William James Premerlani, Scotia, NY (US)

(73) Assignee: GENERAL ELECTRIC COMPANY, Schenectady, NY (US)

(\*) Notice: Subject to any disclaimer, the term of this patent is extended or adjusted under 35 U.S.C. 154(b) by 218 days.

(21) Appl. No.: 15/688,370

(22) Filed: Aug. 28, 2017

(65) Prior Publication Data
US 2019/0067946 A1   Feb. 28, 2019

(51) Int. Cl.
*G06Q 50/06* (2012.01)
*H02J 3/28* (2006.01)
*H02J 3/00* (2006.01)

(52) U.S. Cl.
CPC ............ *H02J 3/28* (2013.01); *G06Q 50/06* (2013.01); *H02J 3/00* (2013.01); *H02J 3/003* (2020.01)

(58) Field of Classification Search
CPC .......... H02J 3/28; H02J 3/00; H02J 2003/003; G06Q 50/06
USPC ......................................................... 700/291
See application file for complete search history.

(56) References Cited

U.S. PATENT DOCUMENTS

| 8,392,031 B2 | 3/2013 | Krok et al. |
| 2005/0090995 A1 | 4/2005 | Sonderegger |
| 2013/0338920 A1* | 12/2013 | Pasken ................. G01W 1/00 702/3 |

(Continued)

FOREIGN PATENT DOCUMENTS

| CN | 101383023 B | 4/2011 |
| CN | 102270309 B | 5/2013 |

(Continued)

OTHER PUBLICATIONS

Extended European Search Report and Opinion issued in connection with corresponding EP Application No. 18190457.4 dated Nov. 30, 2018.

(Continued)

*Primary Examiner* — Thomas C Lee
*Assistant Examiner* — Gary Collins
(74) *Attorney, Agent, or Firm* — Buckley, Maschoff & Talwalkar LLC (57) ABSTRACT

A method for short term load forecasting in a power grid includes obtaining historical data comprising power data, load data and weather data corresponding to time index data recorded from a location in a power distribution network of the power grid. The method further includes receiving power grid data comprising a plurality of power values, and a plurality of weather parameter values corresponding to a plurality of recent time instant values. The method also includes generating modified historical data using statistical techniques to rectify error conditions. The method further includes estimating one or more power values at a future time instant based on the modified historical data and the power grid data. The method also includes balancing load of the power distribution network based on the estimated one or more power values.

16 Claims, 6 Drawing Sheets

(56) References Cited

U.S. PATENT DOCUMENTS

| | | | |
|---|---|---|---|
| 2014/0156322 A1 | 6/2014 | Monforte et al. | |
| 2014/0222228 A1 | 8/2014 | Sawa et al. | |
| 2015/0026109 A1* | 1/2015 | Park | G06N 3/0427 706/21 |
| 2016/0118803 A1* | 4/2016 | Takahashi | H02J 3/383 700/286 |

FOREIGN PATENT DOCUMENTS

| | | | | |
|---|---|---|---|---|
| CN | 102624017 B | 3/2014 | | |
| CN | 103268526 B | 11/2014 | | |
| CN | 105205563 A | 12/2015 | | |
| EP | 2547012 | * | 1/2013 | H04B 17/00 |
| WO | 2013/102932 A2 | 7/2013 | | |

OTHER PUBLICATIONS

Ma et al., "The Short-term Load Forecasting Based on the Rate of Load Fluctuation", International Conference on Intelligent Computation Technology and Automation (ICICTA), http://ieeexplore.ieee.org/document/5750764/, Mar. 28-29, 2011.

Wang et al., "Kernel-Based Clustering for Short-Term Load Forecasting", 10th International Conference on Advances in Power System Control, Operation & Management (APSCOM 2015), http://ieeexplore.ieee.org/document/7832695/, Nov. 3-12, 2015.

Patel et al., "Short Term Load Forecasting of Indian System Using Linear Regression and Artificial Neural Network", 5th Nirma University International Conference on Engineering (NUiCONE), http://ieeexplore.ieee.org/document/7449617/, Nov. 26-28, 2015.

\* cited by examiner

SYSTEM AND METHOD FOR DISTRIBUTION LOAD FORECASTING IN A POWER GRID

BACKGROUND

A system and method are disclosed for short term forecasting of power requirement and specifically for short term load forecasting in a distribution network of a power grid.

Typically, a power grid includes a generation system for generating electric power, a transmission system for transmitting the generated power and a distribution system for distributing the transmitted power. While transmission systems are designed to carry giga watts of power, distribution systems are configured to handle only tens of megawatts of power. Power grids are evolving with deployment of distributed generation techniques that add small quantum of power using smaller power generating centers from multiple locations. Power grids are also increasingly adopting smart technologies leveraging digital communication technology to reduce cost, save energy, and increase reliability.

Forecasting power requirements for an electrical grid is a complex task. A forecast that underestimates demand may result in a brownout or a blackout. A forecast that overestimates demand may result in generation of unused power at considerable expense. Short-term load forecasting refers to estimating the power requirements on an hourly basis ahead of one or more days. Estimation and prediction techniques for short-term forecasting are based on modelling of system loads as a function of weather parameters using statistical techniques. Unfortunately, known technology does not provide precise near-term real-time load forecasts. System operators make critical operating decisions such as selection of generation unit to be dispatched to meet system demand in short span of time. Next-day and near-term load forecasts are often made by system operators as the day unfolds based on the demand data of the previous day. In most cases, these real-time adjustments are not very helpful to determine accurate next-day forecast.

An energy management system (EMS) and a distribution management system (DMS) are important components of a smart grid. EMS and DMS are utilized for providing capabilities to the smart grid to operate the bulk power system in a safe, reliable, and economic manner. Further EMS and DMS are used for developing new functions and capabilities in the smart grid for improving reliability and efficiency of the distribution system of the smart grid. Typically, in the smart grid, the EMS includes load forecasting methodologies for the transmission system and the DMS uses load forecasting methodologies for the distribution system. Generally, estimated load forecasting errors for the transmission system are lower due to stable operating power conditions, whereas estimated load forecasting errors for the distribution system are higher due to large power requirement variability. In some conventional systems, static load profiles (or load shapes) based approaches are used to roughly estimate the short-term load demand in the DMS. Load forecasting approaches based on a consumption pattern in a similar scenario are used when an operator is allowed to build and modify forecasts using historical power grid data. Load forecasting approaches of this type which need human intervention can be time consuming. Further, human intervention is difficult to quantify and requires a certain amount of expertise.

BRIEF DESCRIPTION

In accordance with one aspect of the present invention, a method for short term load forecasting in a power grid is disclosed. The method includes obtaining historical data comprising power data, load data and weather data corresponding to time index data recorded from a location in a power distribution network of the power grid. The method further includes receiving power grid data comprising a plurality of power values, and a plurality of weather parameter values corresponding to a plurality of recent time instant values. The method also includes generating modified historical data using statistical techniques to rectify error conditions. The method further includes estimating one or more power values at a future time instant based on the modified historical data and the power grid data. The method also includes balancing load of the power distribution network based on the estimated one or more power values.

In accordance with another aspect of the present invention, a system for short term load forecasting in a power grid is disclosed. The system includes a data acquisition module configured to obtain historical data comprising power data, load data and weather data corresponding to time index data recorded from a location in a power distribution network of the power grid. The data acquisition module is further configured to receive, from power grid sensors, power grid data comprising a plurality of power values, a plurality of load values and a plurality of weather parameter values corresponding to a plurality of recent time instant values. The system further includes a pre-processing module communicatively coupled to the data acquisition module and configured to determine an error condition in the historical data based on statistical techniques. The pre-processing module is further configured to generate modified historical data using statistical techniques to rectify error conditions. The system also includes a forecasting module communicatively coupled to the pre-processing module and configured to estimate one or more power values at a future time instant based on the modified historical data and the power grid data. The system includes a control module communicatively coupled to the forecasting module and configured to balance load of the power distribution network based on the estimated one or more power values.

In accordance with another aspect of the present invention, a non-transitory computer readable medium having instructions to enable at least one processor module to perform short term load forecasting in a power grid, is disclosed. The instructions enable the at least one processor to perform short term load forecasting by obtaining historical data comprising power data, load data and weather data corresponding to time index data recorded from a location in a power distribution network of the power grid. The instructions further enable the at least one processor to perform short term load forecasting by receiving power grid data having a plurality of power values, and a plurality of weather parameter values corresponding to a plurality of recent time instant values. The instructions also enable the at least one processor to perform short term load forecasting by generating modified historical data using statistical techniques to rectify error conditions. The instructions also enable the at least one processor to perform short term load forecasting by estimating one or more power values at a future time instant based on the modified historical data and the power grid data. Further, the instructions enable the at least one processor to perform short term load forecasting by balancing load of the power distribution network based on the estimated one or more power values.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

As will be described in detail hereinafter, systems and methods are disclosed for short term power forecasting and in particular for short term load forecasting in distribution network of power grids.

The term "load" used herein refers to power demand (in kW) or energy demand (in kW) in a power grid. The term "load" per unit time is used equivalently and interchangeably either with the term "power" or with the energy per unit time. The term "load forecasting" refers to prediction of power (or energy) requirement in a specified time period over a geographical location. For example, load forecasting may be used to predict power requirements on hourly, daily, weekly and monthly basis and also of peak power requirement values per unit time period. The term "power data" refers to active power data, reactive power data, apparent power data or their corresponding magnitude values depending on the context.

Figure 1:
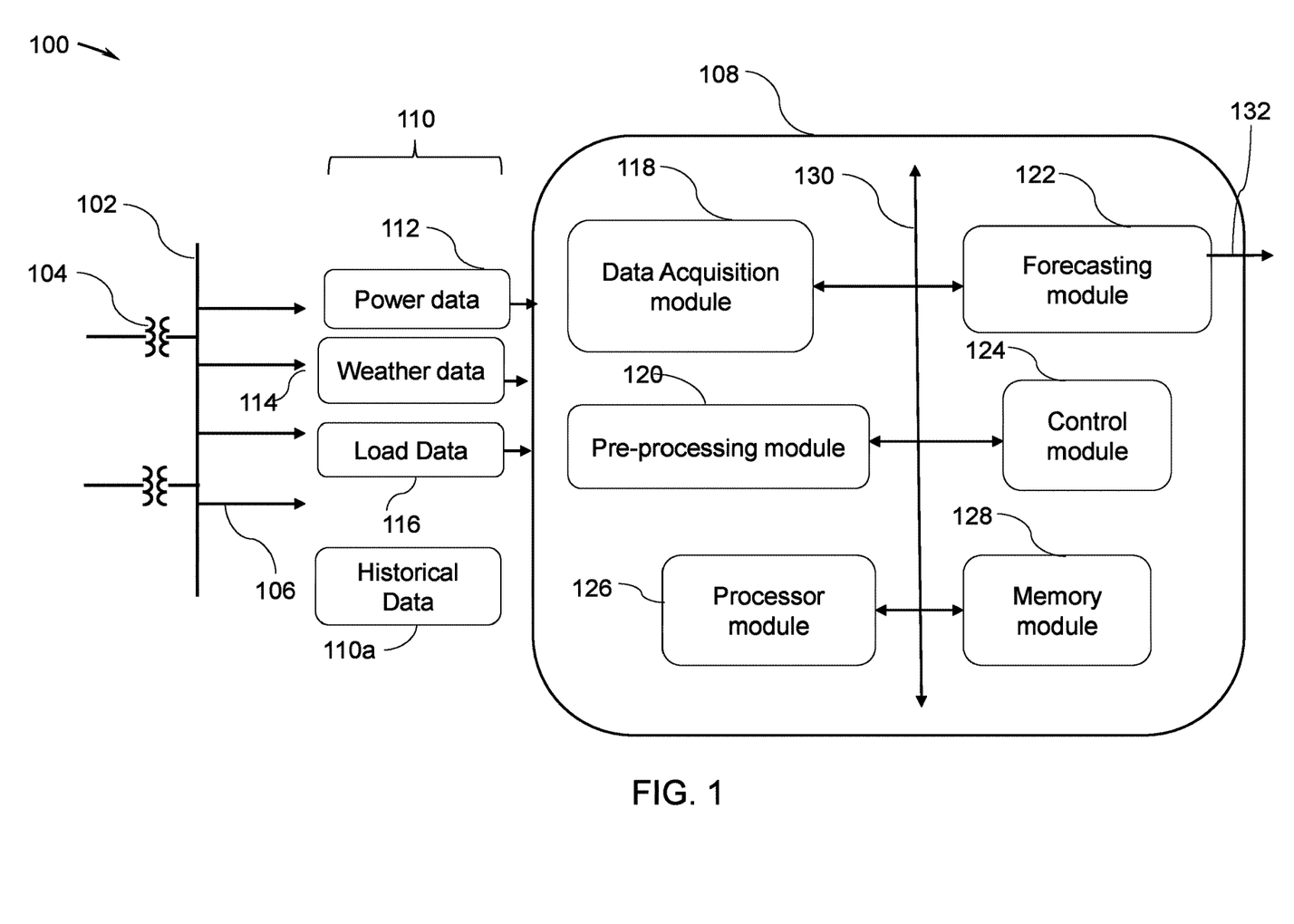
FIG. 1 is a diagrammatic illustration of a system for short term load forecasting in accordance with an exemplary embodiment.

FIG. 1 is a diagrammatic illustration of a distribution network 100 having a system 108 for short term load forecasting in accordance with an exemplary embodiment. The distribution network 100 includes a location 102 having one or more input power lines 104 and a plurality of feeder lines 106. The distribution network 100 may include sensors, actuators, supervisory computers, remote terminal units (RTUs) coupled to the sensors and actuators, programmable logic controllers (PLCs), a communication infrastructure coupling the supervisory computers with the RTUs and PLCs and a human-machine interface (HMI) for managing the distribution network 100 by operating personnel (specific elements of the distribution network 100 not shown). The distribution network 100 generates power grid data 110 such as, but not limited to, power data 112, weather data 114 and load data 116. The distribution network 100 may also generate supervisory data and control data from a control system architecture such as supervisory control and data acquisition (SCADA) architecture. The system 108 is communicatively coupled to the distribution network 100 and configured to receive the power grid data 110 and generate a forecasting parameter 132, representative of power generation by the distribution network 100 at a future instant of time.

The system 108 includes a data acquisition module 118, a pre-processing module 120, a forecasting module 122, a control module 124, a processor module 126 and a memory module 128 interconnected to each other via a communications bus 130.

The data acquisition module 118 is communicatively coupled to the location 102 such as, but not limited to, a substation, a plurality of feeders or a transformer bank, and configured to receive the power grid data 110 from the location 102. The power data 112 includes data acquired from one or more RTUs and PLCs, data generated by supervisory computers, and data received from the operating personnel. In general, the data acquisition module is configured to receive data from a control system architecture such as supervisory control and data acquisition (SCADA) architecture. The data acquisition module 118 is further configured to receive load data 116, representative of power requirements in the distribution network 100. The data acquisition module 118 is further configured to receive weather data 114 as part of the power grid data 110. The weather data 114 may include, but is not limited to, temperature values, atmospheric pressure, wind parameters, solar radiation, precipitation and/or humidity values corresponding to a plurality of time instances. The term "time index data" is used herein to refer to a plurality of time index values used for acquiring measurements from the sensors deployed at the location 102. More generally, the time index data may refer to a time period in the past, a time period at present and a time period in future or combinations thereof. The data acquisition module 118 is configured to store the power grid data 110 acquired previously at time instants specified by the time index data in the memory module 128 as historical data 110a.

The data acquisition module 118 is further configured to obtain the historical data 110a from the memory module 128 in real time. Specifically, the historical data 110a includes, but is not limited to, power data 112, load data 116, weather data 114 corresponding to previous time index data recorded from the location 102. The historical data 110a refers to power grid data 110 acquired previously and stored in the memory module 128. In one embodiment, the power data 112 includes, but is not limited to, one or more historical power values and supply power value corresponding to a past time instant. The load data 116 includes, but is not limited to, power requirement values and actual power supplied values that were recorded at a previous time instant. The weather data may include, but is not limited to, historical temperature values and historical humidity values. In one example, the time index data comprises hourly time stamps during a specified time period. In another example, the time index data may include time stamps corresponding to half an hour time duration. In one embodiment, the specified time period may be a 24-hour duration corresponding to one civic day (24 hours). In another embodiment, the specified time period may span over two civic days (48 hours). The specified time period may also include all days of a calendrical year.

The data acquisition module 118 is further configured to receive power grid data 110 corresponding to a plurality of recent time instants. In one embodiment, the plurality of recent time instants refers to real-time instants. The power grid data 110 includes, but is not limited to, a plurality of load values and a plurality of weather parameter values corresponding to recent time instants. The plurality of weather parameter values may include, but is not limited to, a plurality of temperature values and a plurality of humidity values corresponding to the plurality of power values recorded at the plurality of recent time instants.

Specifically, the data acquisition module 118 is configured to obtain a first plurality of power values recorded in a first time period and a second plurality of power values recorded in a second time period from the memory module 128. The first time period precedes the second time period. The first time period includes past time instants. The second time period includes both past time instants and recent time instants up to present time instant. The term 'recent time instant' refers to one or more time instant preceding to the present time instant. The recent time instant may be one sample period before the present time instant. The recent time instant may be two sample period before the present time instant. The first plurality of power values and the second plurality of power values are selected from the historical data. The second plurality of power values include recent power values.

The pre-processing module 120 is communicatively coupled to the data acquisition module 118 and configured to process the historical data to generate modified historical data. Specifically, the pre-processing module 120 is configured to determine an error condition in the historical data based on statistical techniques. Further, the pre-processing module 120 is configured to rectify the error condition to generate the modified historical data based on the historical data. In one embodiment, the pre-processing module 120 is configured to select the first plurality of power values corresponding to the first time period and the second plurality of power values corresponding to the second time period. The pre-processing module 120 is further configured to estimate a second plurality of power estimates based on the first plurality of power values. In one embodiment, an auto regression technique is used to estimate the second plurality of power estimates. In alternate embodiments, other statistical techniques such as, but not limited to, linear prediction, linear regression, multivariate regression, moving average technique are used to determine the second plurality of power estimates. At least one of a linear model, a non-liner model, a moving average (MA) model, an autoregressive (AR) model and an autoregressive moving average (ARMA) model may be used to implement the statistical techniques.

Further, the pre-processing module 120 is further configured to compare the second plurality of power estimates with the second plurality of power values to determine a difference value. The pre-processing module 120 is further configured to determine an error condition based on the difference value and a predetermined threshold value. In one embodiment, the pre-processing module 120 is configured to modify the second plurality of power values based on the second plurality of power estimates to generate a modified second plurality of power values. The modified second plurality of power values is either error free or includes reduced effects of the error condition. In one embodiment, the modified second plurality of power values is generated by replacing some of the second plurality of power values by the corresponding second plurality of power estimates. The modified historical data includes the modified second plurality of power values.

The forecasting module 122 is communicatively coupled to the pre-processing module 120 and configured to estimate one or more power values at a future time instant based on the historical data and the modified historical data. In one embodiment, a third plurality of power values corresponding to a third time period is determined based on the modified second plurality of power values corresponding to the second time period. As noted, the first time period precedes the second time period, and the second time period precedes the third time period. In one embodiment, the forecasting module 122 is configured to use a linear model to determine the third plurality of power values based on the modified second plurality of power values and forecast of the weather data. Specifically, the linear model is given by Equation (1):

$$P_f(t) = a*P(t-1) + b*T_f(t) + c \qquad \text{Equation (1)}$$

where, $P_f(t)$ is a power value at a future time instant t, $P(t-1)$ is a modified power value at a past time instant, $T_f(t)$ is a temperature value corresponding to the future time instant determined from temperature value corresponding to the past time instant. The terms a, b and c are coefficients of the linear model of Equation (1). In one embodiment, one linear model for each of the twenty four hours of a day is determined based on the modified historical data. A plurality of sets of coefficients is determined corresponding to each of the plurality of linear models.

In one example, a least mean square (LMS) algorithm is used to derive the plurality of sets of coefficients. Specifically, a plurality of LMS filters corresponding to the third time period is determined based on the historical data. The plurality of linear models is applied to the modified second plurality of power values to determine the third plurality of power values.

Further, the forecasting module 122 is configured to perform a regression based correction to the third plurality of power values. In one embodiment, the forecasting module 122 is configured to receive a pair of recorded power values corresponding to a pair of recent time instants in the second time period. The pair of time instants comprises a first time instant and a second time instant, where the second time instant occurs subsequent to the first time instant. The forecasting module 122 is also configured to determine a pair of forecast error values based on the pair of recorded power values and a corresponding pair of estimated power values. In one embodiment, the pair of estimated power values are selected from the modified second plurality of power values. In some embodiments, the pair of recorded power values may be obtained either from the historical data or by measurements. The pair of estimated power values may be obtained either from the historical data or by computation. The forecasting module 122 is further configured to determine a regression model based on the pair of forecast error values. In one embodiment, the regression model may be a simple two-term regression model. Specifically, the two-term regression model is given by Equation (2):

$$P_e(t) = e(t-1)*\varphi_1 + e(t-2)*\varphi_2 \qquad \text{Equation (2)}$$

where, $P_e(t)$ is a correction term corresponding to predicted power value of Equation (1), e(t−1), e(t−2) are error estimates at a first time instant and a second time instant in the second time period. The constants φ1 and φ2 are determined using known power correction terms for two time instants. The third plurality of power values are modified using the regression model to determine short term power predicted values. Specifically, a plurality of modified second plurality of power values are processed by the regression model of Equation (2) to generate a plurality of short term power correction values. The plurality of short term correction values is added to the third plurality of power values to generate a modified third plurality of power values. The modified third plurality of power values are used as estimated one or more power values.

The control module 124 is communicatively coupled to the forecasting module 122 and configured to balance load of the distribution network 100 based on the estimated one or more power values. The balancing of load on the distribution network 100 may include storage of power during off-peak demand hours and retrieving the stored power during peak demand hours using smart grid features.

The processor module 126 includes at least one of a general-purpose computer, a GPU, a digital signal processor, and a controller. In other embodiments, the processor module 126 includes a customized processor element such as, but is not limited to, an application-specific integrated circuit (ASIC) and a field-programmable gate array (FPGA). The processor module 126 may be further configured to receive commands and parameters from an operator via console that has a keyboard or a mouse or any other input device for generating the forecasting parameter 132. In some embodiments, the processor module 126 may perform one or more functions of at least one of the data acquisition module 118, the pre-processing module 120, the forecasting module 122 and the control module 124. The processor module 126 may include more than one processor co-operatively working with each other for performing intended functionalities. The processor module 126 is further configured to store (or retrieve) contents into (or from) the memory module 128. In one embodiment, the processor module 126 is configured to initiate and control the functionality of at least one of the data acquisition module 118, the pre-processing module 120, the forecasting module 122, and the control module 124.

In one embodiment, the memory module 128 is a random-access memory (RAM), read only memory (ROM), flash memory or any other type of computer readable memory accessible by at least one of the data acquisition module 118, the pre-processing module 120, the forecasting module 122 and the control module 124. In one embodiment, the memory module 128 may be a non-transitory computer readable medium encoded with a program having a plurality of instructions to instruct at least one of the data acquisition module 118, the pre-processing module 120, the forecasting module 122 and the control module 124 to perform a sequence of steps to generate the forecasting parameter 132. The program may further instruct the system 108 to balance the load at the location 102 of the power distribution grid.

In one embodiment, a non-transitory computer readable medium having instructions to enable at least one processor module to perform short term load forecasting in a distribution network of a power grids is disclosed. The instructions enable the at least one processor module to receive power grid data and historical data and generate a forecasting parameter 132. The instructions further enable the at least one processor to obtain historical data comprising power data, load data and weather data corresponding to time index data recorded from a location in a power distribution network of the power grid. The instructions further enable the at least one processor to receive power grid data comprising a plurality of power values, a plurality of load values and a plurality of temperature values corresponding to a plurality of recent time instant values. The instructions further enable the at least one processor to process the power grid data based on the historical data using statistical techniques to rectify error conditions and to generate modified historical data. The instructions further enable the at least one processor to estimate one or more power values at a future time instant based on the modified historical data and the historical data. The instructions further enable the at least one processor to balance load of the power distribution network based on the estimated one or more power values.

Figure 2:
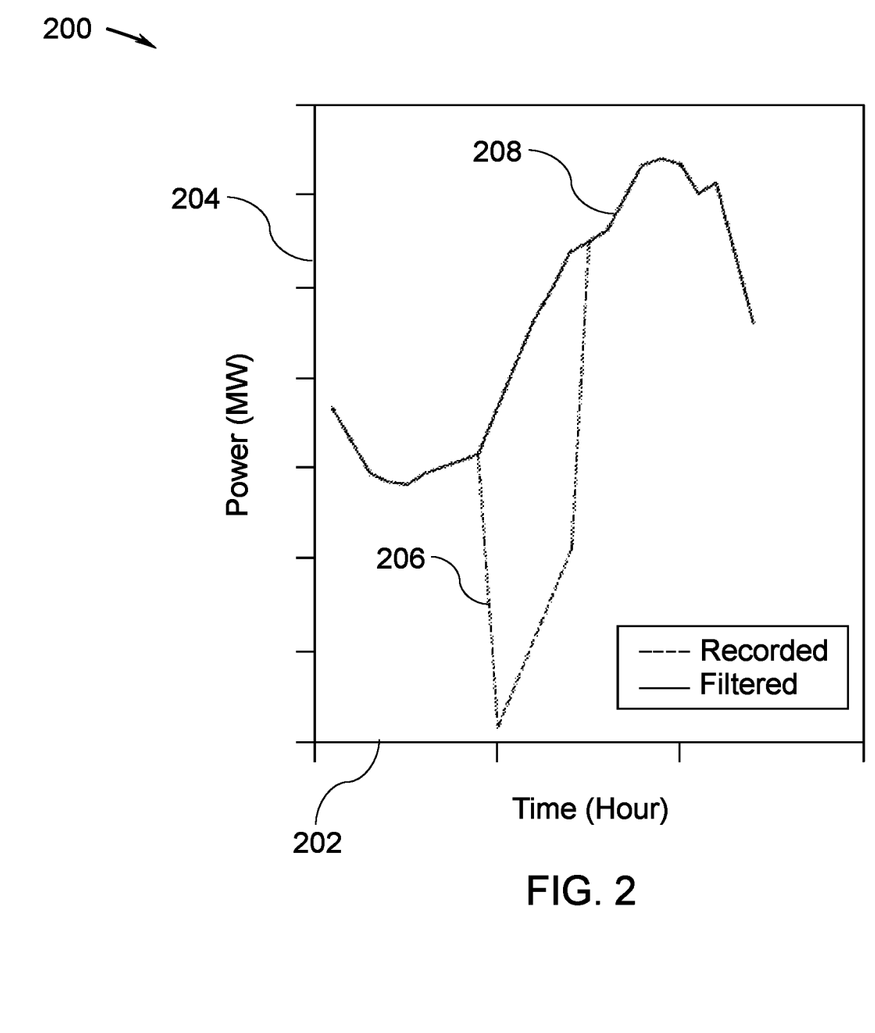
FIG. 2 is a graphical representation illustrating a filtering technique used to correct errors in power grid data in accordance with an exemplary embodiment.

FIG. 2 is a graphical representation 200 illustrating a filtering technique used to rectify errors in historical data in accordance with an exemplary embodiment. The graphical representation 200 includes an x-axis 202, representative of time in hours and a y-axis 204, representative of power in megawatts. The graphical representation 200 includes a first curve 206 corresponding to a plurality of power values representative of recorded power having abrupt amplitude changes indicative of faulty measurements. The filtering technique disclosed herein is able to identify abrupt amplitude changes by using suitable threshold values. The abrupt amplitude changes thus identified are replaced by suitable amplitude values from historical data to reduce magnitude of abrupt variations. The graphical representation 200 also includes a second curve 208 corresponding to a modified plurality of power values, representative of a filtered power values. With reference to the illustrated embodiment of FIG. 1, the first curve 206 is representative of second plurality of power values and the second curve 208 is representative of modified plurality of second power values.

Figure 3:
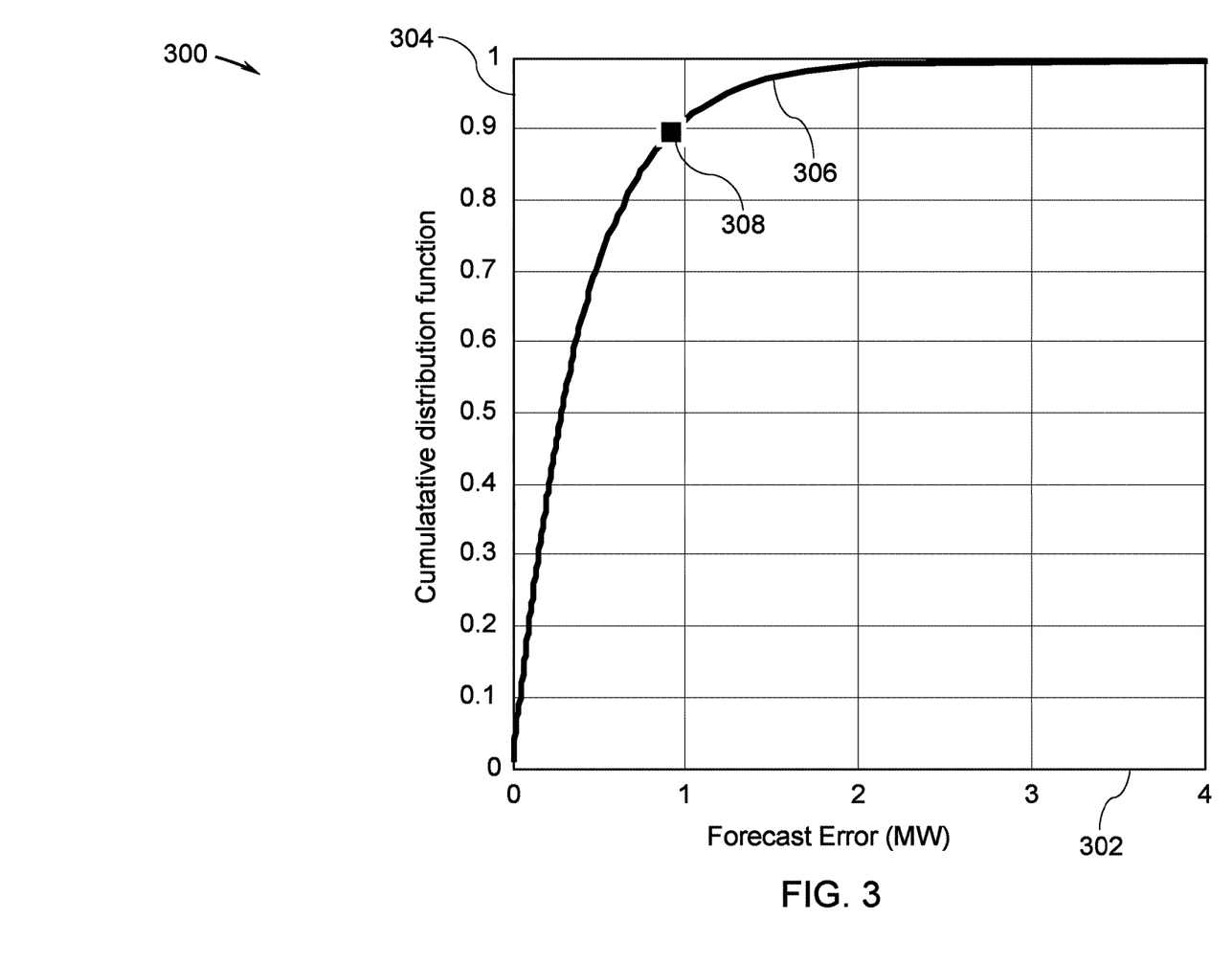
FIG. 3 is a graph illustrating performance of power forecasting in a distribution system in accordance with an exemplary embodiment.

FIG. 3 is a graph 300 illustrating performance of power forecasting in a distribution system in accordance with an exemplary embodiment. The graph 300 includes an x-axis 302, representative of error forecast in megawatts and a y-axis 304, representative of normalized amplitude value of cumulative error values. The graph 300 includes a curve 306, representative of a cumulative distribution function indicative of cumulative probability value corresponding to a forecast error value. A point 308 on the curve 306 corresponds to a cumulative probability value of 0.9 for a forecast error of about 1 MW. This is demonstrative of performance of power forecasting with estimation error limited to 1 MW for 90% of the time.

Figure 4:
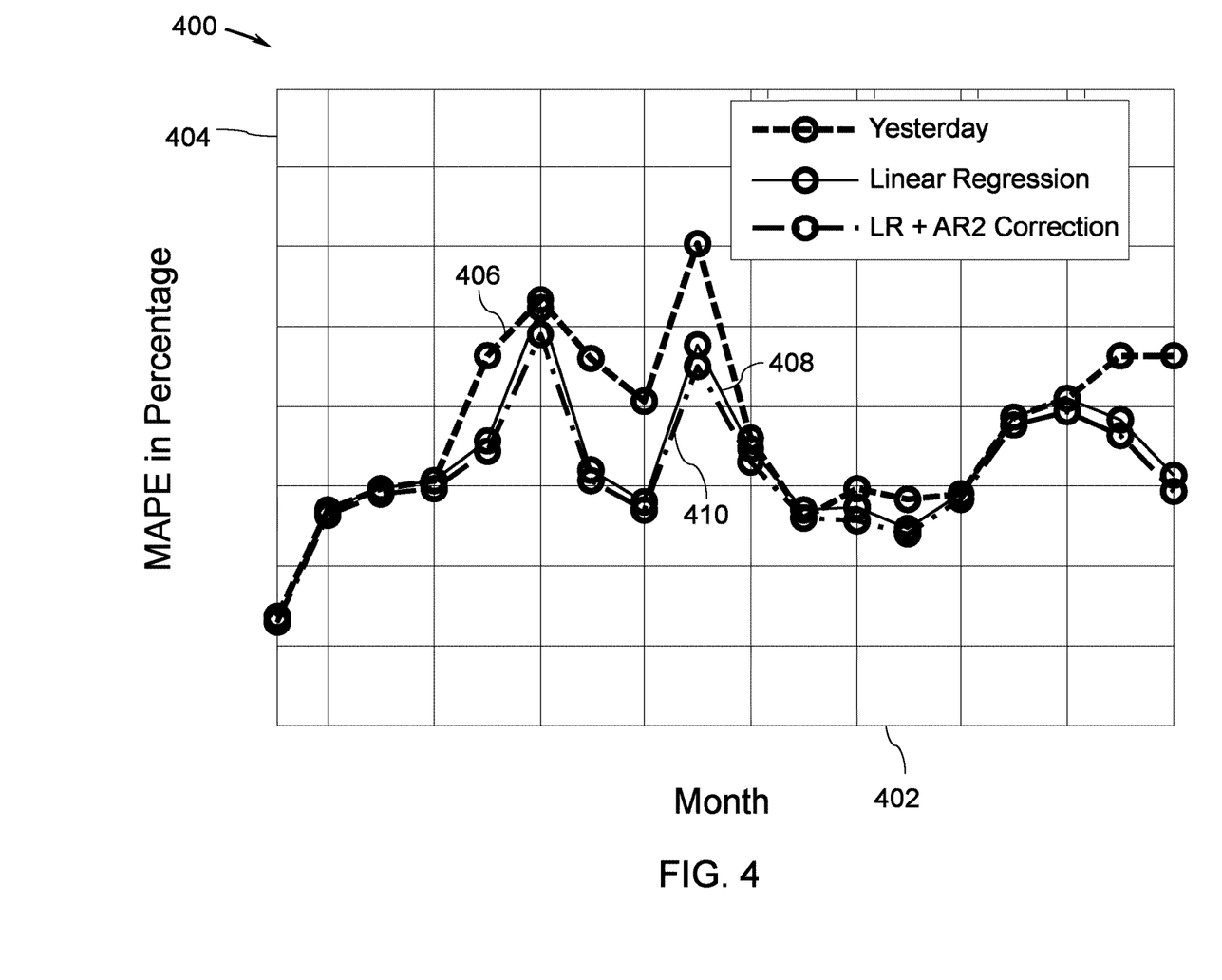
FIG. 4 is a graph illustrating regression based power forecasting in accordance with an exemplary embodiment.

FIG. 4 is a graph 400 illustrating regression based power forecasting in accordance with an exemplary embodiment. The graph 400 includes an x-axis 402, representative of time in months and a y-axis 404, representative of mean absolute percentage error (MAPE) in percentage numbers. The graph 400 includes a first curve 406, representative of MAPE computed based on power grid data on a previous day. The graph 400 includes a second curve 408 representative of MAPE computed based on linear regression technique. The graph 400 includes a third curve 410, representative of MAPE obtained based on prediction generated using second order auto regressive correction. It may be observed that the MAPE of the second curve 408 is lower compared to MAPE value corresponding to the first curve 406 and comparable to MAPE value of the third curve 410 illustrating the effectiveness of the load prediction based on load demands of the previous day.

Figure 5:
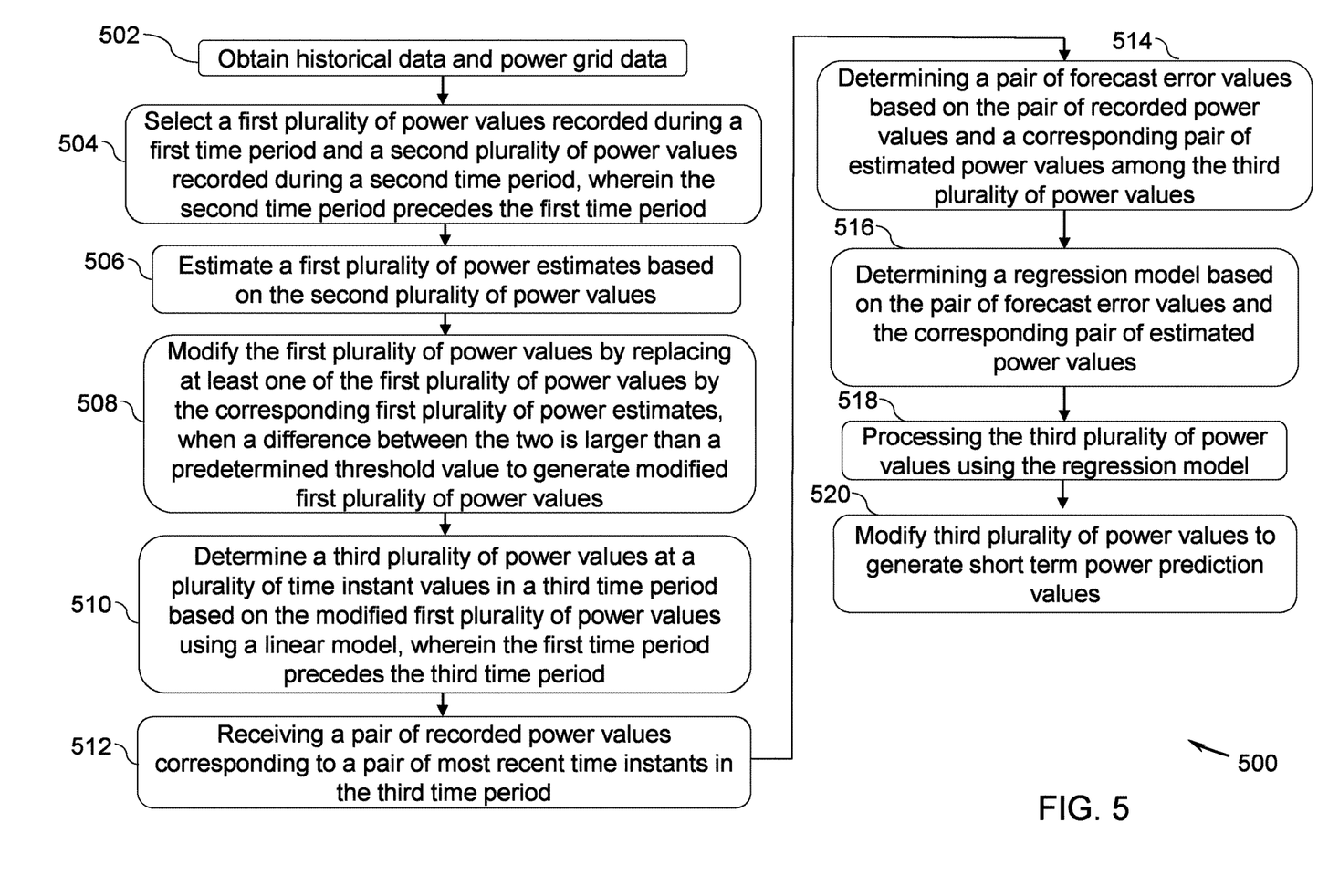
FIG. 5 is a flow chart illustrating a method for power forecasting in accordance with an exemplary embodiment.

FIG. 5 is a flow chart 500 illustrating a method for power forecasting in accordance with an exemplary embodiment. The flow chart 500 begins with obtaining historical data and power grid data in step 502. In step 504, a first plurality of power values recorded during a first time period and a second plurality of power values recorded during a second time period is selected. It may be noted that the first time period precedes the second time period. In one example, the first time period corresponds to a first day and the second time period corresponds to a consecutive day or a second day. In step 506, a second plurality of power estimates is determined based on the first plurality of power values. The first plurality of power values and the second plurality of power values are part of the historical power data. In one embodiment, the second plurality of power values is modified based on the first plurality of power values to generate modified second plurality of power values. Specifically, a second plurality of power estimates are determined based on the first plurality of power values using one or more linear models. The second plurality of power values are replaced by corresponding second plurality of power estimates when the difference between the two is greater than a predetermined threshold value.

The modified second plurality of power values is determined by replacing at least one of the second plurality of power values by the corresponding at least one of the modified second plurality of power estimates when a difference between the two is larger than a predetermined threshold value as illustrated in step 508. Further, in step 510, a third plurality of power values at a third time period is determined based on the modified second plurality of power values using a linear model. In this embodiment, the third plurality of power values are estimates of one or more power values at a future instant of time. It may be noted herein that the first time period precedes the second time period and the second time period precedes the third time period. In step 512, a pair of recorded power values corresponding to a pair of recent time instants in the second time period is received. Further, a pair of forecast error values is determined based on the pair of recorded power values and a corresponding pair of estimated power values among the second plurality of power values, as illustrated in step 514. In one embodiment, a regression model is determined based on the pair of forecast error values and the corresponding pair of estimated power values in step 516. In step 518, the plurality of third power values corresponding to the plurality of time instant values in the third time period is modified using the regression model. Specifically, a plurality of short term power correction values is determined by processing the third plurality of power values by the regression model. The plurality of short term correction values is added to the third plurality of power values to generate a modified third plurality of power values. The modified third plurality of power values is representative of short term power prediction output as illustrated in step 520. In one embodiment, the modified third plurality of power values are estimates of one or more power values at a future instant of time.

Figure 6:
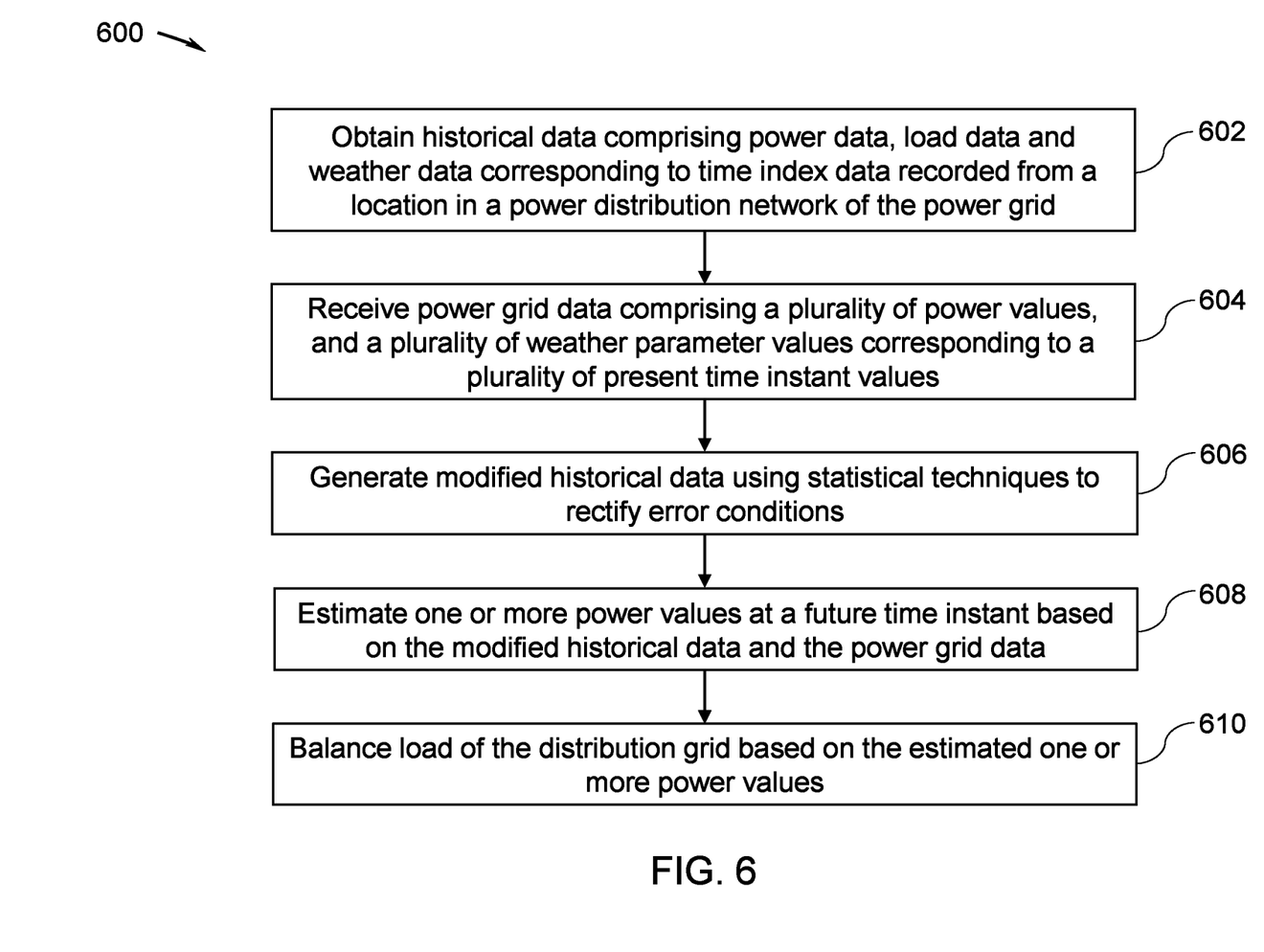
FIG. 6 is a flow chart of a method of short term load forecasting in a distribution system in accordance with an exemplary embodiment.

FIG. 6 is a flow chart of a method 600 of short term load forecasting in a distribution system in accordance with an exemplary embodiment. The method 600 includes obtaining historical data generated by a power distribution network of a power grid in step 602. The historical data includes power data, load data and weather data corresponding to time index data recorded from a location in the power distribution network. The historical data includes a plurality of historical power values and a plurality of historical temperature values at the location corresponding to time index data. In one embodiment, the step of receiving the historical data includes recording power consumption at the location corresponding to time index data comprising hourly time stamp values. In another embodiment, the step of receiving the historical data includes recording a correlation between temperature value and the power consumption corresponding to the location corresponding to the hourly time stamp values.

The method further includes receiving power grid data comprising a plurality of power values, a plurality of load values and a plurality of weather parameter values corresponding to a plurality of recent time instant values as illustrated in step 604. In one embodiment, the power grid data includes, but not limited to data from a control system architecture such as supervisory control and data acquisition (SCADA) architecture, and weather forecast data. In one embodiment, the step 604 of receiving the power grid data includes measuring a plurality of power consumption values at the location at hourly time stamp values of the present day.

The method also includes processing the historical data based on statistical techniques to rectify error conditions and generate modified historical data as illustrated in step 606. In another embodiment, the step 606 of processing the historical data includes estimating a plurality of power values based on the historical data.

In one embodiment, estimating a power value at a future time instant is based on the modified historical data as shown in step 608. In another embodiment, the step 608 of estimating the power values includes determining a plurality of linear models corresponding to the plurality of time instant values using least mean squared estimation technique. Further one or more power values are generated by processing the modified historical data using the plurality of linear models. The one or more power values correspond to a future time instant values. In one embodiment, the step 608 of estimating the power value includes determining a pair of forecast error values estimated for a pair of recent time instants. The step 608 of estimating the power value further includes determining a two-term regression model based on the pair of forecast error values. The step 608 of estimating the power value also includes processing the one or more power values using the regression model. At step 610, the method also includes balancing load of the power distribution network based on the estimated power value.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

The invention claimed is:

1. A method for short term load forecasting in a power grid, comprising:
   obtaining historical data comprising power data, load data and weather data corresponding to time index data recorded from a location in a power distribution network of the power grid;
   receiving power grid data comprising a plurality of power values, and a plurality of weather parameter values corresponding to a plurality of recent time instant values;
   generating modified historical data using statistical techniques to rectify error conditions, wherein generating modified historical data comprises:
   selecting a first plurality of power values recorded in a first time period and a second plurality of power values recorded in a second time period, wherein the first time period precedes the second time period;

determining a second plurality of power estimates based on the first plurality of power values; and rectifying the second plurality of power values by replacing at least one of the second plurality of power values by corresponding second plurality of power estimates when a difference between the two is larger than a predetermined threshold value to generate modified second plurality of power values;

estimating one or more power values at a future time instant, based on the modified historical data using a linear model and the power grid data at a more recent time instant, wherein the estimation comprises determining a third plurality of power values at a plurality of time instant values in a third time period, and wherein the first time period precedes the third time period and the second time period precedes the third time period; and balancing load of the power distribution network based on the estimated one or more power values.

2. The method of claim 1, wherein obtaining the historical data comprises recording a plurality of historical power values and a plurality of historical temperature values at the location corresponding to time index data, wherein the time index data comprises hourly time stamp values.

3. The method of claim 2, wherein receiving the historical data comprises recording a correlation between the plurality of historical temperature values and the plurality of historical power values.

4. The method of claim 1, wherein receiving the power grid data comprises measuring a plurality of power values at the location at a plurality of time stamp values in a specified time period.

5. The method of claim 1, wherein estimating the one or more power values at the future time instant comprises receiving a pair of recorded power values corresponding to a pair of time instants in the second time period, wherein the pair of time instants comprises a first time instant and a second time instant subsequent to the first time instant;

determining a pair of forecast error values based on the pair of recorded power values and a corresponding pair of estimated power values;

determining a regression model based on the pair of forecast error values and the corresponding pair of estimated power values; and modifying the third plurality of power values based on the modified second plurality of power values using the regression model.

6. The method of claim 1, wherein estimating the one or more power values at the future time instant comprises determining a plurality of linear models corresponding to the plurality of time instant values using a least mean squared estimation technique.

7. The method of claim 1, wherein receiving the power grid data comprises receiving data from supervisory control and data acquisition (SCADA) architecture, and weather forecast data.

8. The method of claim 1, wherein the more recent time instant is a real-time instant.

9. A system for short term load forecasting in a power grid, comprising: a data acquisition module configured to:

obtain historical data comprising power data, load data and weather data corresponding to time index data recorded from a location in a power distribution network of the power grid;

receive, from power grid sensors, power grid data comprising a plurality of power values, a plurality of load values and a plurality of weather parameter values corresponding to a plurality of recent time instant values;

a pre-processing module communicatively coupled to the data acquisition module and configured to:

determine an error condition in the historical data based on statistical techniques;

generate modified historical data using statistical techniques to rectify error conditions, wherein generating modified historical data comprises:

selecting a first plurality of power values recorded in a first time period and a second plurality of power values recorded in a second time period, wherein the first time period precedes the second time period;

determining a second plurality of power estimates based on the first plurality of power values; and rectifying the second plurality of power values by replacing at least one of the second plurality of power values by corresponding second plurality of power estimates when a difference between the two is larger than a predetermined threshold value to generate modified second plurality of power values;

a forecasting module communicatively coupled to the pre-processing module and configured to estimate one or more power values at a future time instant based on the modified historical data using a linear model and the power grid data at a more recent time instant wherein the estimation comprises determining a third plurality of power values at a plurality of time instant values in a third time period, wherein the first time period precedes the third time period and the second time period precedes the third time period; and a control module communicatively coupled to the forecasting module and configured to balance load of the power distribution network based on the estimated one or more power values.

10. The system of claim 9, wherein the data acquisition module is configured to record a plurality of historical power values and a plurality of historical temperature values at the location corresponding to time index data, wherein the time index data comprises hourly time stamp values.

11. The system of claim 10, wherein the data acquisition module is configured to record a correlation between the plurality of historical temperature values and the plurality of historical power values.

12. The system of claim 9, wherein the data acquisition module is configured to measure a plurality of power values at the location at hourly time stamp values in a specified time period.

13. The system of claim 9, wherein the forecasting module is configured to:

receive a pair of recorded power values corresponding to a pair of time instants in the second time period, wherein the pair of time instants comprises a first time instant and a second time instant subsequent to the first time instant;

determine a pair of forecast error values based on the pair of recorded power values and a corresponding pair of estimated power values;

determine a regression model based on the pair of forecast error values and the corresponding pair of estimated power values; and modify the third plurality of power values based on the modified second plurality of power values using the regression model.

14. The system of claim 9, wherein the forecasting module is configured to determine a plurality of linear models corresponding to the plurality of time instant values using a least mean squared estimation technique.

15. The system of claim 9, wherein the data acquisition module is configured to receive data from supervisory control and data acquisition (SCADA) architecture, and weather forecast data.

16. A non-transitory computer readable medium having instructions to enable at least one processor module to perform short term load forecasting in a power grid by:
  obtaining historical data comprising power data, load data and weather data corresponding to time index data recorded from a location in a power distribution network of the power grid;
  receiving power grid data comprising a plurality of power values, and a plurality of weather parameter values corresponding to a plurality of recent time instant values;
  generating modified historical data using statistical techniques to rectify error conditions, wherein generating modified historical data comprises:
    selecting a first plurality of power values recorded in a first time period and a second plurality of power values recorded in a second time period, wherein the first time period precedes the second time period;
    determining a second plurality of power estimates based on the first plurality of power values; and
    rectifying the second plurality of power values by replacing at least one of the second plurality of power values by corresponding second plurality of power estimates when a difference between the two is larger than a predetermined threshold value to generate modified second plurality of power values;
  estimating one or more power values at a future time instant based on the modified historical data using a linear model and the power grid data at a more recent time instant wherein the estimation comprises determining a third plurality of power values at a plurality of time instant values in a third time period, wherein the first time period precedes the third time period and the second time period precedes the third time period; and
  balancing load of the power distribution network based on the estimated one or more power values.

* * * * *